(12) United States Patent
Nickerson et al.

(10) Patent No.: US 7,865,455 B2
(45) Date of Patent: Jan. 4, 2011

(54) SYSTEM AND METHOD FOR PROVIDING INTELLIGENT SUPPORT

(75) Inventors: Rand B. Nickerson, Highland Park, IL (US); Mark A. Treschl, Highland Park, IL (US)

(73) Assignee: OpinionLab, Inc., Highland Park, IL (US)

( * ) Notice: Subject to any disclaimer, the term of this patent is extended or adjusted under 35 U.S.C. 154(b) by 446 days.

(21) Appl. No.: 12/048,136

(22) Filed: Mar. 13, 2008

(65) Prior Publication Data

US 2009/0235236 A1 Sep. 17, 2009

(51) Int. Cl.
*G06F 17/00* (2006.01)
*G06N 5/00* (2006.01)
(52) U.S. Cl. .................................. 706/45; 717/128
(58) Field of Classification Search .................. 706/45
See application file for complete search history.

(56) References Cited

U.S. PATENT DOCUMENTS

| | | | |
|---|---|---|---|
| 5,537,618 | A | 7/1996 | Boulton et al. |
| 5,568,489 | A | 10/1996 | Yien et al. |
| 5,678,041 | A | 10/1997 | Baker et al. |
| 5,706,507 | A | 1/1998 | Schloss |
| 5,727,950 | A | 3/1998 | Cook |
| 5,754,939 | A | 5/1998 | Herz et al. |
| 5,761,683 | A | 6/1998 | Logan et al. |
| 5,778,182 | A | 7/1998 | Cathey et al. |
| 5,804,803 | A | 9/1998 | Cragun et al. |
| 5,809,247 | A | 9/1998 | Richardson et al. |
| 5,862,223 | A | 1/1999 | Walker et al. |
| 5,862,260 | A | 1/1999 | Rhoads |
| 5,862,325 | A | 1/1999 | Reed et al. |
| 5,870,744 | A | 2/1999 | Sprague |
| 5,872,850 | A | 2/1999 | Klein et al. |
| 5,958,008 | A | 9/1999 | Pogrebisky et al. |
| 5,973,683 | A | 10/1999 | Cragun et al. |
| 5,974,572 | A | 10/1999 | Weinberg et al. |
| 5,991,735 | A | 11/1999 | Gerace |
| 6,029,171 | A | 2/2000 | Smiga et al. |

(Continued)

FOREIGN PATENT DOCUMENTS

CA 2 490 828 2/2004

(Continued)

OTHER PUBLICATIONS

Vora, P.R., "Designing for the Web: A Survey," design/methods & tools, interjections, pp. 13-30, May-Jun. 1998.

(Continued)

*Primary Examiner*—Michael Holmes
(74) *Attorney, Agent, or Firm*—Baker Botts L.L.P.

(57) ABSTRACT

According to one embodiment, a computer-implemented method for providing intelligent support includes using at least one computer system to access information associated with a user experience for a particular user of a web page, the accessed information including user feedback collected from the particular user using feedback collection software; accessing intervention trigger logic; identify at least one intervention trigger by applying the intervention trigger logic to at least a portion of the accessed information; and generate one or more intervention elements for presentation to the particular user, in response to the identification of at least one intervention trigger, to improve the user experience for the particular user.

19 Claims, 9 Drawing Sheets

U.S. PATENT DOCUMENTS

| | | | |
|---|---|---|---|
| 6,035,330 | A | 3/2000 | Astiz et al. |
| 6,134,531 | A | 10/2000 | Trewitt et al. |
| 6,141,010 | A | 10/2000 | Hoyle |
| 6,161,112 | A | 12/2000 | Cragun et al. |
| 6,189,029 | B1 | 2/2001 | Fuerst |
| 6,236,975 | B1 | 5/2001 | Boe et al. |
| 6,243,722 | B1 | 6/2001 | Day et al. |
| 6,260,064 | B1 | 7/2001 | Kurzrok |
| 6,297,819 | B1 | 10/2001 | Furst |
| 6,385,590 | B1 | 5/2002 | Levine |
| 6,389,538 | B1 | 5/2002 | Gruse et al. |
| 6,393,479 | B1 | 5/2002 | Glommen et al. |
| 6,421,724 | B1 | 7/2002 | Nickerson et al. |
| 6,434,556 | B1 | 8/2002 | Levin et al. |
| 6,449,632 | B1 | 9/2002 | David et al. |
| 6,460,036 | B1 | 10/2002 | Herz |
| 6,477,504 | B1 | 11/2002 | Hamlin et al. |
| 6,480,852 | B1 | 11/2002 | Himmel et al. |
| 6,510,427 | B1 | 1/2003 | Bossemeyer, Jr. et al. |
| 6,578,014 | B1 | 6/2003 | Murcko, Jr. |
| 6,606,581 | B1 | 8/2003 | Nickerson et al. |
| 6,606,657 | B1 | 8/2003 | Zilberstein et al. |
| 6,606,659 | B1 | 8/2003 | Hegli et al. |
| 6,618,717 | B1 | 9/2003 | Karadimitriou et al. |
| 6,631,184 | B1 | 10/2003 | Weiner |
| 6,681,247 | B1 | 1/2004 | Payton |
| 6,748,449 | B1 | 6/2004 | Dutta |
| 6,766,481 | B2 | 7/2004 | Estep et al. |
| 6,772,139 | B1 | 8/2004 | Smith, III |
| 6,792,458 | B1 | 9/2004 | Muret et al. |
| 6,819,336 | B1 | 11/2004 | Nielsen |
| 6,859,784 | B1 | 2/2005 | van Duyne et al. |
| 6,895,437 | B1 | 5/2005 | Cowdrey et al. |
| 6,928,392 | B2 | 8/2005 | Nickerson et al. |
| 6,938,202 | B1 | 8/2005 | Matsubayashi et al. |
| 6,954,740 | B2 * | 10/2005 | Talker ............... 705/75 |
| 7,024,691 | B1 | 4/2006 | Herzberg et al. |
| 7,181,696 | B2 | 2/2007 | Brock |
| 7,308,429 | B1 * | 12/2007 | Tozzi ............... 705/39 |
| 7,370,285 | B1 | 5/2008 | Nickerson et al. |
| 7,478,121 | B1 | 1/2009 | Nickerson et al. |
| 7,725,328 | B1 * | 5/2010 | Sumner et al. ............... 705/2 |
| 2001/0047290 | A1 | 11/2001 | Petras et al. |
| 2002/0049713 | A1 | 4/2002 | Khemlani et al. |
| 2002/0065802 | A1 | 5/2002 | Uchiyama |
| 2002/0072955 | A1 | 6/2002 | Brock |
| 2002/0087526 | A1 | 7/2002 | Rao |
| 2002/0087679 | A1 | 7/2002 | Pulley et al. |
| 2002/0087969 | A1 | 7/2002 | Brunheroto et al. |
| 2002/0099617 | A1 | 7/2002 | Fogelson |
| 2002/0111865 | A1 | 8/2002 | Middleton, III et al. |
| 2002/0120727 | A1 | 8/2002 | Curley et al. |
| 2003/0009555 | A1 | 1/2003 | Nickerson et al. |
| 2003/0085927 | A1 | 5/2003 | Muller |
| 2003/0115023 | A1 | 6/2003 | Nickerson et al. |
| 2003/0207238 | A1 | 11/2003 | Latzina et al. |
| 2003/0217034 | A1 | 11/2003 | Shutt et al. |
| 2004/0015866 | A1 | 1/2004 | Estep et al. |
| 2004/0049571 | A1 | 3/2004 | Johnson et al. |
| 2004/0201633 | A1 | 10/2004 | Barsness et al. |
| 2004/0205065 | A1 | 10/2004 | Petras et al. |
| 2005/0108020 | A1 | 5/2005 | Lehavi |
| 2005/0192854 | A1 | 9/2005 | Ebert et al. |
| 2005/0240618 | A1 | 10/2005 | Nickerson et al. |
| 2005/0251399 | A1 | 11/2005 | Agarwal et al. |
| 2006/0248188 | A1 | 11/2006 | Nickerson et al. |
| 2006/0259767 | A1 | 11/2006 | Mansz et al. |
| 2006/0265368 | A1 | 11/2006 | Nickerson et al. |
| 2008/0033790 | A1 | 2/2008 | Nickerson et al. |
| 2008/0059286 | A1 | 3/2008 | Nickerson et al. |
| 2008/0109489 | A1 * | 5/2008 | Sherwood ............... 707/104.1 |
| 2008/0209361 | A1 | 8/2008 | Nickerson et al. |

FOREIGN PATENT DOCUMENTS

| | | |
|---|---|---|
| WO | WO 99/59096 | 11/1999 |
| WO | WO 00/62204 | 10/2000 |
| WO | WO 01/16841 | 3/2001 |
| WO | WO 2004/012044 | 2/2004 |

OTHER PUBLICATIONS

OpinionLab [online], "dna," DIARIST.NET, http://www.diarist.net/active /showthread.php?t=345>, XP002382097, 2 pages, May 8, 2001 Retrieved May 22, 2006.

OpinionLab, "OL™ the leader in automated web feedback solutions," white papers, www.opinionlab.com, pp. 1-70, Printed Jul. 11, 2007.

OpinionLab, "O-Metric Demonstration Tutorial," 6 pages, available prior to Jul. 31, 2001.

OpinionLab, "Best Practices in Collecting Web User Feedback," pp. 1-10, Apr. 2001.

OpinionLab, "OpinionLab's Audit of the Fifty Most Trafficked Websites," pp. 1-4, 2002.

OpinionLab, "Millions of people visit Websites every day. What do they think? It's a simple premise. If you want to know what people think, you have to ask them. (+)" white papers, 23 pages, available prior to Jul. 31, 2001.

OpinionLab, "Brochure re: User Experience Optimization," 1 page, available prior to Jul. 31, 2001.

OpinionLab, "Brochure re: Navigating an O-Metric Report," pp. 1-3, available prior to Jul. 31, 2001.

OpinionLab, "The OnlineOpinion System—Different From Other Feedback Techniques," XP002382096, [online], http://web.archive.org/web/20021010024033/www.opinionlab.com/different.asp>, 2 pages, Jul. 23, 2002 Retrieved May 22, 2006.

BizRate.com, Independent Merchant Evaluation, https://eval.bizrate.com/popchoice.pl?id=19383&rb=l&ip=204.194.97.2& xsum=67748, 1 page; https://eval.bizrate.com/eval_t.pl?id=19383& ip=204.194.97.2&xsum=67748&g=102, 5 pages, Printed Jun. 13, 2000.

OpinionLab, "Different Versions of the Online Opinion Data Collection Technique Dramatically Impact the Type of Response a Website Receives," White Paper, 5 pages, © 2001.

Graham, J., "Alternatives to Testing User Experience," [online], Clickz.com, http://www.clickz.com/experts/brand/emkt_strat/print.php/827111, XP002382095, 2 pages, Jul. 31, 2000 Retrieved on May 22, 2006.

Shahabi, C., et al., "Knowledge Discovery from Users Web-Page Navigation," XP010219671, ISBN: 0-8186-7849-6, Research Issues in Data Engineering, 1997 Proceedings, Seventh International Workshop on Birmingham, UK Apr. 7-8, 1997, Los Alamitos, CA, USA, IEEE Computer Society US, pp. 20-29, Apr. 7, 1997.

Watt, J.H., et al., "Using the Internet for Audience and Customer Research," XP010355892, ISBN: 0-7803-579-09-04, Professional Communication Conference 1999, IPCC 99, Communication Jazz: Improvising the New International Communication Culture, Proceedings 1999, IEEE International New Orleans, LA, Piscataway, NJ, USA, IEEE US, pp. 121-130, Sep. 7-10, 1999.

Katerattanakul, P., et al., "Measuring Information Quality of Web Sites: Development of an Instrument," from the 20th International Conference on Information Systems, 7 pages, Jan. 1999.

Tullis, T.S., "A Method of Evaluating Web Page Design Concepts," from CHI 98 Conference Summary on Human Factors in Computing Systems, ACM, ISBN 1-58113-028-7, 2 pages, Apr. 1998.

Faison, T., "Component-Based Development with Visual C#," Online!, XP002333001, Chapter 8, Creating Front Ends with the WebBrowser Component, pp. 1-4, 27, 33, Feb. 2002.

Etgen, M., et al., "What Does Getting WET (Web Event-Logging Tool) Mean for Web Usability?," Proceedings of the 5th Conference on Human Factors & the Web, XP002332999, Jun. 3, 1999.

Blankenbeckler, D., "Browser Support for Active Content," Chapter 25, XP-002333000, Excerpted from: Morgan, Bryan, "*Visual J++ Unleashed*," Online!, SAMS.NET, Indianapolis, IND., http://web.

archive.org/web/20040301061953/http://ww.intel.com/procs/ppro/intro/vrml/mma.wrz, http://docs.rinet.ru/ZhPP/ch25.htm, 11 pages, Retrieved Jun. 21, 2005.

PCT, Notification of Transmittal of International Preliminary Examination Report, PCT/US00/23875, 5 pages, Aug. 22, 2002.

PCT, Notification of Transmittal of the International Search Report or the Declaration, PCT/US 03/23857, 7 pages, Jan. 8, 2004.

PCT, Notification of Transmittal of the International Search Report or the Declaration, PCT/US03/23327, 6 pages, Sep. 7, 2004.

EP, European Search Report—Communication, Application No. EP 05252213.3-1238, 4 pages, Jun. 30, 2005.

EP, Supplemental European Search Report—Communication, Application No. 03771825.1-2205, Patent No. PCT/US0323250, Application No. EP 03771825.1-2205, 3 pages, Jun. 21, 2006.

PCT, Notification of Transmittal of the International Search Report or the Declaration, PCT/US06/18184, 9 pages, mailed Mar. 7, 2008.

European Patent Office, Communication for Application No. 07016965.1-1238, Nov. 7, 2007.

Canadian Intellectual Property Office, "Office Action," for Application No. 2,489,322, 5 pages, Nov. 14, 2008.

Nickerson et al., "Measuring a Page-Specific Subjective User Reaction Concerning Each of Multiple Web Pages of a Website," U.S. Appl. No. 10/136,919 (179), May 11, 2002.

Nickerson et al., "Soliciting User Feedback regarding One or More Web Pages of a Website without Obscuring Visual Content," U.S. Appl. No. 10/870,024 (192), Jun. 16, 2004.

Nickerson et al., "Using Software Incorporated Into a Web Page to Collect Page-Specific User Feedback Concerning a Document Embedded in the Web Page," U.S. Appl. No. 11/104,329, Apr. 11, 2005.

Nickerson et al., "Measuring Subjective User Reaction Concerning a Particular Document," U.S. Appl. No. 11/135,045, May 23, 2005.

Nickerson et al., "Computer-Implemented System and Method for Measuring and Reporting Business Intelligence Based on Comments Collected from Web Page Users Software Associated with Accessed Web Pages," U.S. Appl. No. 11/847,676, Aug. 30, 2007.

Nickerson et al., "System and Method for Measuring and Reporting User Reactions to Advertisements on a Web Page," U.S. Appl. No. 11/832,747, Aug. 2, 2007.

Nickerson et al., "Receiving and Reporting Page-Specific User Feedback Concerning One or More Particular Web Pages of a Website," U.S. Appl. No. 12/115,442, May 5, 2008.

* cited by examiner

Comment Card

Page Comments:

Choose a topic for your comments:
[Please choose one ▼]

Please enter your comments about this page.
[◄           ►]
1000 characters remaining.

Account related questions? Click here.

Email Address: (not required)
[_____]

Optional Questions:

1. How likely are you to share information about our services with your colleagues?

|  | -- | - | +- | + | ++ |
|---|---|---|---|---|---|
| Content | ○ | ○ | ○ | ○ | ○ |
| Design | ○ | ○ | ○ | ○ | ○ |
| Usability | ○ | ○ | ○ | ○ | ○ |
| Overall | ○ | ○ | ○ | ○ | ○ |

Page Ratings

|  | -- | - | +- | + | ++ |
|---|---|---|---|---|---|
|  | ○ | ○ | ○ | ○ | ○ |

Privacy Policy   About this system

[Submit]

*FIG. 3*

SYSTEM AND METHOD FOR PROVIDING INTELLIGENT SUPPORT

TECHNICAL FIELD

This invention relates generally to computer-implemented user support and more particularly to a computer-implemented system and method for providing intelligent support to a user.

BACKGROUND

In many situations, a business will have to expend greater resources to attract a new customer than to retain an existing customer. In some industries, common practices have developed to retain customers when it is determined that the customer is not pleased with a product or service. For example, free products or services may be offered, apologies may be made, or discounts may be provided. Similarly, when it is determined that a customer is pleased with a product or service, some businesses take steps to develop additional business from that customer. Many businesses provide websites for customers, potential customers, partners, and the general public. However, anonymous and self-service aspects of some web-based business applications make it difficult to categorize a customer's experience or to take any action to address that experience.

Overview

According to one embodiment, a computer-implemented method for providing intelligent support includes using at least one computer system to access information associated with a user experience for a particular user of a web page, the accessed information including user feedback collected from the particular user using feedback collection software; accessing intervention trigger logic; identify at least one intervention trigger by applying the intervention trigger logic to at least a portion of the accessed information; and generate one or more intervention elements for presentation to the particular user, in response to the identification of at least one intervention trigger, to improve the user experience for the particular user.

Certain embodiments may provide a number of technical advantages related to intelligent support for websites and other interactive media. Certain embodiments may enable real-time analysis of user feedback. Certain embodiments may provide real-time responses to user feedback and/or characteristics of a user's experience. Certain embodiments may improve the ability to provide support to users. Certain embodiments may provide faster and more accurate assistance to users. Certain embodiments may allow managers to respond to common problems experienced by users of the website or other interactive media. Certain embodiments may help managers recognize when a user is having a poor experience and take appropriate action to mitigate the problem to improve their experience. Certain embodiments allow for automated intervention when a user is having a poor experience. Certain embodiments may improve user retention by addressing user needs in real-time. Certain embodiments allow improved methods of advertising and cross selling to users of websites and other interactive media. Certain embodiments may provide all, some, or none of the advantages described. Certain embodiments may provide one or more other technical advantages, one or more of which may be readily apparent to those of skilled in the art from the figures, descriptions, and claims included herein.

BRIEF DESCRIPTION OF THE DRAWINGS

For a more complete understanding of the present invention and for further features and advantages thereof, reference is now made to the following description taken in conjunction with the accompanying drawings, in which:

FIG. 3 illustrates an example element for receiving user feedback;

DETAILED DESCRIPTION

Figure 1:
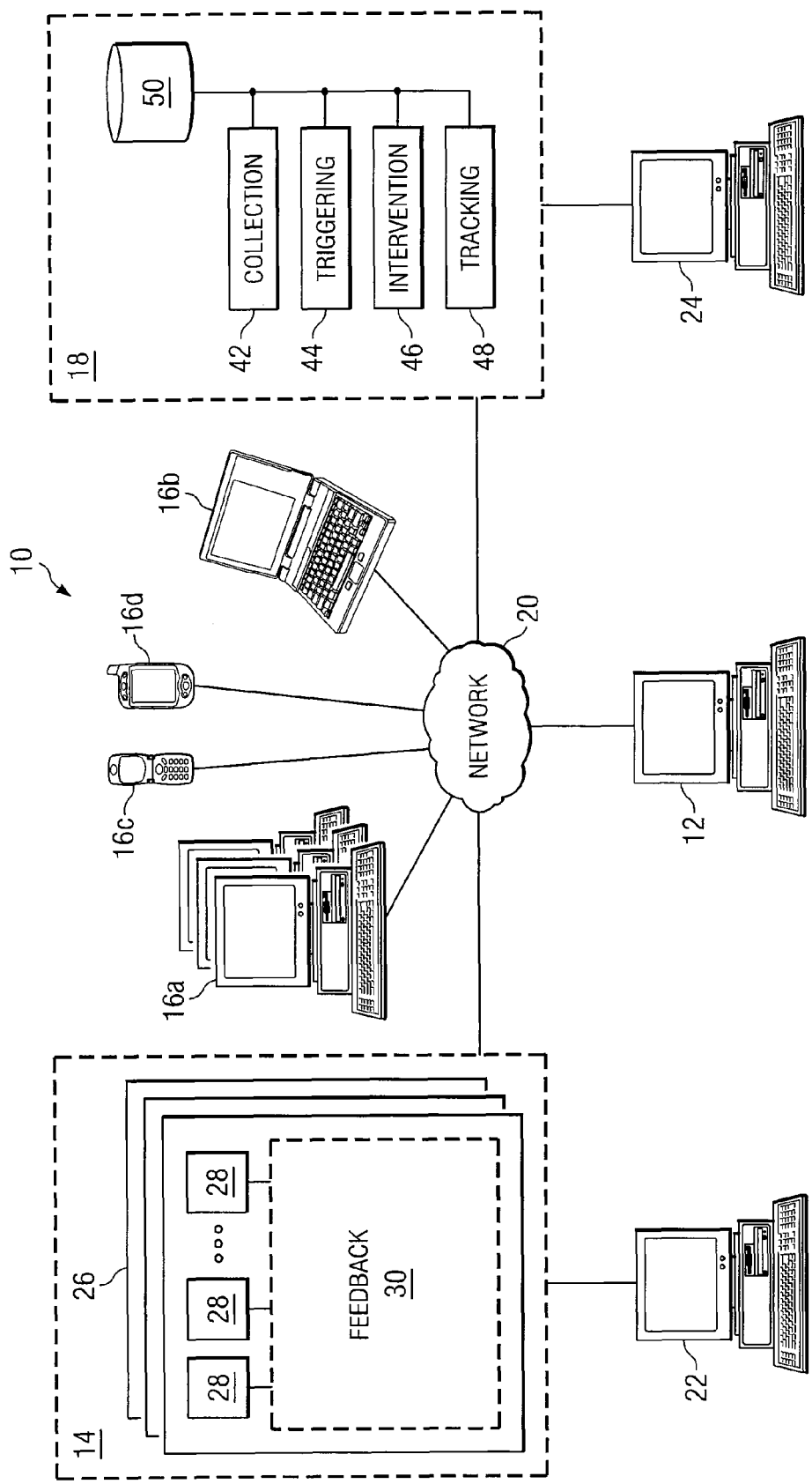
FIG. 1 illustrates an example system for providing intelligent support.

Users often experience difficulties interacting with electronic information. For example, web page users often have difficulty navigating particular web pages to find desired content within a website. Users may have technical issues with certain websites, such as if the user has a low screen resolution that may not allow a website to display properly or if the version of the user's browser or operating system is not compatible with the web pages. Users may have difficulty utilizing aspects or content of web pages, such as accessing audio or video files, due to technical issues (e.g., lacking software installation or updates). Some users have trouble viewing certain web pages due to color schemes, text size, or display formats. Other user difficulties related to web pages and other forms of interactive media are well known to those skilled in the art.

These and other difficulties may lead to a user's dissatisfaction with, for example, a particular web page or an entity associated with the web page. As a result of this dissatisfaction, a user may choose to discontinue the use of the website or web page. Additionally or alternatively, a dissatisfied user may choose to discontinue the use of products and/or services of the associated entity. By collecting information related to the particular user's experience, real-time intelligent support may be provided that may improve the user's experience and thereby encourage their continued use of the website, web page, products, services, etc. In certain embodiments, this intelligent support may be provided in the form of various real-time interventions that may provide information to the user, redirect the user to improve their experience, provide enhanced interactions for the user, etc.

For example, if a website has a particular feature that has compatibility problems with a particular operating system (or a particular revision level of the operating system) intelligent support may be provided to assist particular users who are, or may be, experiencing problems as a result of this compatibility problem. For example, if a particular user provides feedback related to this particular feature and it is independently determined that the user is using the problematic operating system, information may be provided to the particular user to instruct the user of the cause of the problem and one or more recommended solutions to the particular problem. For example, a window may be displayed to the user that states: "It appears that you may be having problems using feature X. We have determined that there are compatibility issues with the use of feature X for user's who are running operating system Y, release level Z. Please click here to be directed to instructions for addressing this compatibility issue." Through the use of this form of intervention, the user's satisfaction with the website may be salvaged and the likelihood that the user will continue to utilize the website may be increased. Such increased usage is one advantage that may result from the use of certain embodiments providing intelligent support.

Although some embodiments of the invention are described in connection with providing intelligent support for users of one or more particular websites, embodiments of the invention may be similarly applied in connection with other forms of interactive media, such as interactive video (e.g., DVDs); video games, interactive documents, and other media with graphical or textual user interfaces. Alternative embodiments of the invention are described in connection with leveraging a particular user's experience on one or more particular web pages. Embodiments of the invention may be similarly applied in connection with leveraging a particular user's experience with other forms of interactive media. Those skilled in the art will readily appreciate the application of the present invention to such activities based on these figures, descriptions, and claims.

FIG. 1 illustrates an example system 10 for providing intelligent support. System 10 includes website owner system 12, web server 14, one or more user devices 16, and support server 18 coupled to one another using network 20. Owner system 12 may be an autonomous computer system or may receive appropriate input from one or more associated persons. User device 16 may be a device capable of accessing a web page or other interactive media. In particular embodiments, user device 16 may be desktop computer 16a, laptop computer 16b, PDA 16c, or wireless phone 16d. Although example user devices 16 are identified herein, any appropriate device may be used to interact with one or more other components of system 10. For example, user device 16 may be any device capable of accessing a network such as, for example, the Internet. Web server 14 and support server 18 may include software operating on one or more computer systems 22. In certain embodiments, owner system 12, web server 14, and support server 18 may operate on at least one shared computer system. In certain embodiments, web server 14 and support server 18 may be locally or remotely distributed across multiple computer systems. In certain embodiments, web server 14 and support server 18 may be co-located on a single device. In certain embodiments, owner system 12, user device 16, web server 14, and/or support server 18 may include input devices, output devices, processors, memories, and other components suitable for the features and operation described below.

Web server 14 may host or otherwise support at least one website 26 including one or more pages 28. Although pages 28 are described primarily as web pages associated with a typical website, certain embodiments of the invention may be utilized to provide intelligent support for other forms of interactive media. Additionally, although a single website 26 for a single owner system 12 is described in detail, web server 14 may support one or more websites 26 for each of multiple owner systems 12. In general, using an associated web browser or other software component, user device 16 may identify, generate, transmit, or otherwise provide a uniform resource locator (URL) or other electronic address to establish a connection to web server 14 and access a particular page 28 associated with website 26. Web server 14 communicates the requested page 28 to user device 16 using network 20, user device 16 receives page 28, and user device 16 displays or otherwise processes page 28 according to a user's particular needs. User device 16 will typically provide one or more additional URLs during a single browser session to access additional pages 28 associated with website 26, as a user navigates through the topography of website 26 according to particular needs. Multiple user devices 16 may access a single page 28 substantially simultaneously. The present invention contemplates one or more user devices 16 accessing one or more pages 28 of website 26 in any suitable manner during one or more browser sessions.

Each user that views or otherwise accesses page 28 using a user device 16 may have an opinion, assessment, feeling, or other subjective reaction to page 28, either in its entirety or more specifically to the format, content, design, or other characteristic associated with page 28. For example only and not by way of limitation, a user may consider a particular page 28 helpful, informative, understandable, humorous, or may otherwise have a positive or favorable reaction to page 28, generally or with respect to one or more specific aspects of page 28. Alternatively, for example and without limitation, the user may consider a particular page 28 unhelpful, uninformative, confusing, boring, ineffective, unpleasant, faulty, or may otherwise have a negative or unfavorable reaction to page 28, generally or with respect to one or more specific aspects of page 28. Additionally, the user's response to a page 28 may be the result of technical difficulties such as an inability to view page 28 properly due to a low screen resolution, problems caused by a particular operating system or lack of software updates or support, or problems caused by particular browsers used to access page 28. The strength of this subjective reaction, whether positive or negative, may vary from mild to very strong. Rather than having a positive or negative reaction, the user may have a neutral reaction to page 28. Moreover, the subjective reaction of the user to page 28, generally or as to specific aspects, may be different from the subjective reaction of the user to other pages 28 or to website 26 in its entirety.

Additionally or alternatively, each user that views or otherwise accesses page 28 using a user device 16 may have an opinion, assessment, feeling, or other subjective reaction to website 26, the content of website 26, products, services, or functions offered, described, or delivered through website 26, or to an entity or entities associated with page 28 or website 26. For example only and not by way of limitation, a user may have an opinion of one or more aspects of a business entity associated with website 26. Such opinions may be related to various business-related categories, such as customer service, sales, products, marketing, and corporate operations.

In certain embodiments, a user's reactions to website 26, to one or more particular web pages 28 of website 26, and/or to an entity associated with page 28 or website 26 are collected and compiled. In certain embodiments, web server 14 supports a feedback tool 30 that may be incorporated into pages 28 and may be communicated to user device 16 with a web page 28 in response to user device 16 requesting page 28. In certain embodiments, tool 30 may be incorporated in page 28, both as a viewable icon and as suitable software components, in a manner that does not conflict with the existing design or coding of page 28. In a particular embodiment, tool 30 includes software code incorporated into the Hypertext Markup Language (HTML), Extensible Markup Language (XML), or other software code of page 28. Tool 30 also includes one or more JAVASCRIPTS, or other suitable scripts, that may be stored in a dedicated or other suitable directory. In the particular embodiment, the software code incorporated into page 28 calls the script in response to a user selecting an icon associated with tool 30 to provide a subjective user reaction. Tool 30 may be incorporated in one or more pages 28 of website 26, directly or indirectly such as through a call to a script within a dedicated directory or in any appropriate manner without departing from the intended scope of the present invention. In response to a user accessing the associated page 28, the incorporated software code and the directory containing the script are communicated with page 28 to the user. Unless otherwise specified or appropriate, a reference to tool 30 is meant to include reference to the viewable icon, the script and its directory, the call to the script incorporated in the code of page 28, and any other components of tool 30, singly or in any combination. In one embodiment, tool 30 continues to execute on user device 16, with associated page 28, until the user provides a user reaction or closes the user's web browser.

Support server 18 includes collection module 42, triggering module 44, intervention module 46, tracking module 48, and database 50. Although each module is described separately, two or more of these modules may be combined and/or certain modules may be formed from one or more additional modules. Collection module 42 includes logic to collect information regarding a particular user's experience. This information may include current and/or historical feedback, current and/or historical web traffic history, contextual information, purchasing history, and/or demographic information. Triggering module 44 includes logic to analyze one or more portions of the information collected by collection module 42 to determine whether a particular intervention is needed at a particular time for a particular user. Intervention module 46 includes logic to identify and generate one or more interventions to improve a user's experience. Tracking module 48 includes logic to collect, store, and monitor a user's utilization of particular interventions. In certain embodiments, tracking module 48 may further include logic to correlate intervention utilization with overall user retention information. Further description of the logic and associated functions associated with collection module 42, triggering module 44, intervention module 46, and tracking module 48 is provided below. In certain embodiments, database 50 stores information collected and used by collection module 42, triggering module 44, intervention module 46, and tracking module 48. Although database 50 is described herein as a single database, in certain embodiments, the information stored in database 50 may be distributed across multiple databases housed in one or multiple local or remotely distributed systems.

Components of system 10 may be coupled using network 20. Network 20 may be any suitable local area network (LAN), metropolitan area network (MAN), wide area network (WAN), global communications network (such as the Internet), or any other suitable network. Although owner system 12, web server 14, user devices 16, and support server 18 are described as coupled using a single network 20, the present invention contemplates multiple networks 20 of the same type or different types to couple these components to one another, according to particular needs.

Although system 10 is described herein as an example system for providing intelligent support, any appropriate system may be used to accomplish the functions disclosed herein without departing from the scope of certain embodiments of the present invention. For example, the components of system 10 may be combined in a stand-alone system without the need for network 20. In addition, example system 10, substantially similar systems, or other appropriate systems may be used to leverage a particular user's experience in addition to, or as an alternative to, providing intelligent support.

In certain embodiments, feedback may be collected through the use of a feedback mechanism associated with a particular website, web page, or element associated with a web page. In the description provided, many example embodiments utilize electronically collected feedback, and more particularly feedback collected through a web page mechanism. However, alternative embodiments of the present invention may utilize or operate with feedback collected using alternative tools and techniques, alone or in combination with feedback electronically collected through a web page feedback mechanism. The present invention is intended to encompass these alternative embodiments.

Figure 2:
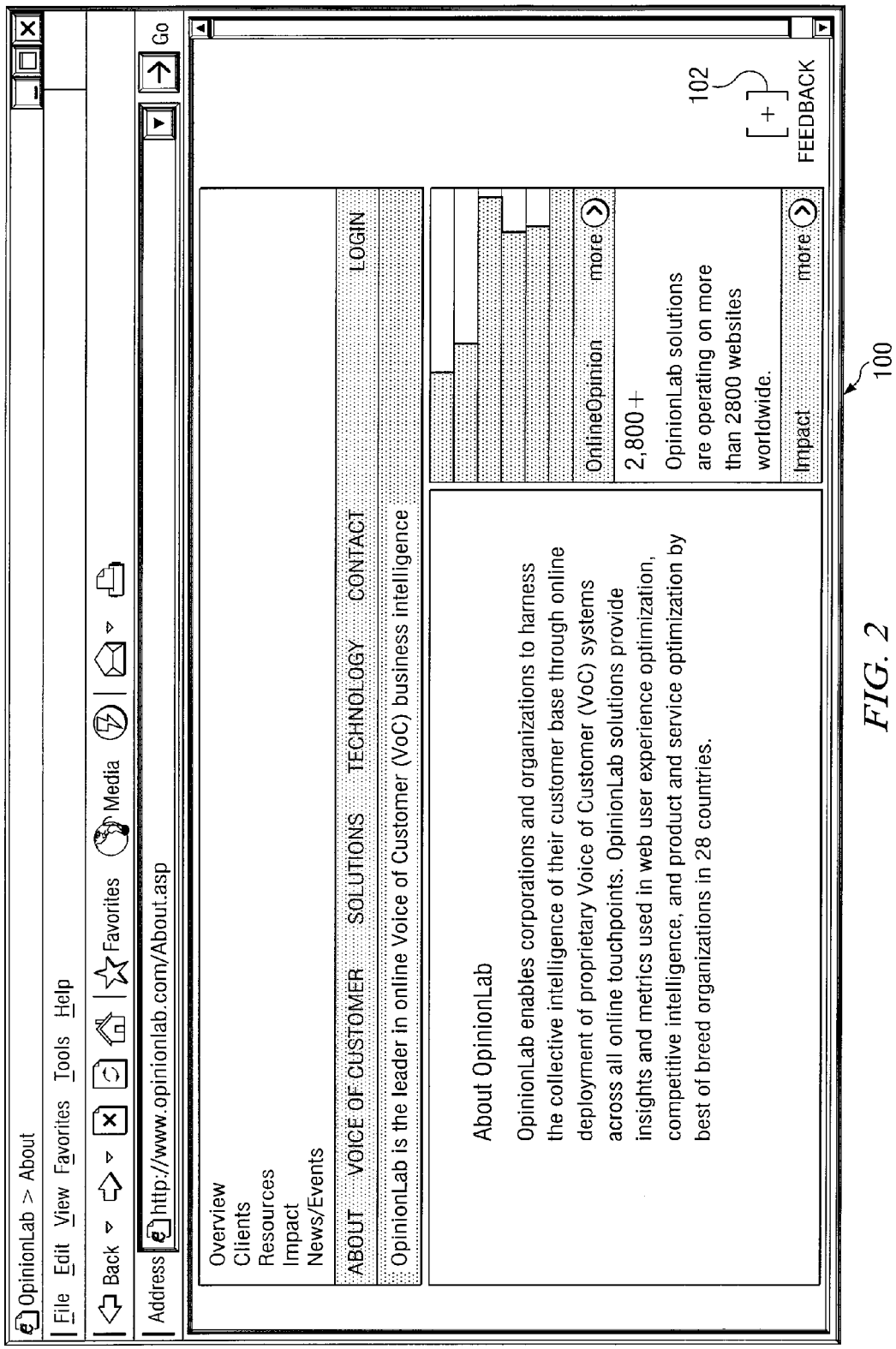
FIG. 2 illustrates an example web page displaying an example element for soliciting user feedback.

An example web page feedback mechanism may utilize a first element for soliciting user feedback and a second element for receiving user feedback. FIG. 2 illustrates an example web page 100 displaying an example element 102 for soliciting user feedback. In the example shown, element 102 is an icon positioned in the lower right corner of web page 100. FIG. 3 illustrates an example element 200 for receiving user feedback. In the example shown, element 200 is a form with several multi-level rating scales 202, a topic selector 204, a comment box 206 that may be utilized to provide open-ended comments, and a feedback tool for collecting responses to an explicit question 208. In certain embodiments, a feedback mechanism may include tools to collect demographic information for a user providing feedback. In certain embodiments, a feedback mechanism may include tools to collect web page information, such as the web page title, URL, load time, and load date. In certain embodiments, a feedback mechanism may include tools to collect the time and/or date that the feedback is provided. In certain embodiments, a feedback mechanism may include tools to collect contextual information for a user, such as the user's IP address, hostname, username, password, network connection, time zone, operating system, web browser, screen resolution, plug-ins, referring page, browser history, or other appropriate aspects of the user's environment or experience.

In certain embodiments, element 200 may be presented in response to a user selecting element 102. In certain embodiments, element 200 may open in a separate window from web page 100, in the same window as web page 100 replacing web page 100, or in a frame within the same window as web page 100. In certain embodiments, element 200 may be integrated with or near other content on web page 100. In certain embodiments, element 200 may be designed or intended to collect web-page specific user feedback, product or service specific user feedback, company specific user feedback or combinations thereof.

In certain embodiments, although element 200 may be designed or intended to collect specific types of user feedback, additional types of feedback may also be collected. For example, element 200 may be designed or intended to collect feedback related to a particular web page, but may be used by web page users to provide feedback unrelated to the particular web page, such as feedback on one or more customer service or product related issues. As another example, element 200 may be designed or intended to collect feedback related to a particular product or service, but may be used by web page users to provide feedback related to general corporate operations or recent news about the business.

In embodiments of element 200 that include comment box 206 or other tools for receiving open-ended user feedback, element 200 may collect user feedback related to various aspects of a web page, website, product, service, associated entity, and/or its operation. In certain embodiments, user feedback may be categorized by the user that provides the feedback through the use of one or more tools available at the time the feedback is provided. For example, while a user is viewing element 200 displayed by a computer system, the user may identify a category for a particular user comment, using topic selector 204. As an alternative, all or a portion of the user comments may be automatically categorized by one or more software applications executed on a computer system, in response to the user comments being accessed. For example, a software application executed on a computer system may utilize keyword associations to categorize user comments. In addition, or as an alternative, a software application executed on a computer system may utilize inductive learning algorithms, including Bayesian filters, or other appropriate logic to categorize user comments. In certain embodiments, a software application executed on a computer may utilize natural language interpretation techniques.

In certain embodiments, user comments may be categorized at least in part based on the user's demographic information, contextual information, or other information relating to the user or the user's methods of providing feedback. For example, user comments may be categorized based on the user's IP address, hostname, username, password, network connection, time zone, operating system, web browser, screen resolution, plug-ins, referring page, and/or browser history. In certain embodiments, this categorization based on demographic information or contextual information may be used as an alternative to, or in addition to, categorization based on the user's comments or other feedback.

At the time that feedback is provided by a user through the use of a feedback mechanism, such feedback may provide a strong indication of whether the user is having a positive, neutral, or negative experience. By processing this feedback in real-time, alone or in combination with other information, actions can be taken to improve or enhance that particular user's experience at or near that particular point in time. In situations where the particular user is having a negative experience, such real-time intervention may be necessary to retain the user. In some situations, the few seconds after a user submits feedback may be the only opportunity to improve the user's experience before they leave the website, never to return. Accordingly, the ability to take action in this few seconds may be critical to retain a user, such as a web customer. Although not required, in certain embodiments, in order to take action to intervene with a particular user's experience, characteristics of the user's experience must be determined, triggering or threshold requirements must be met, and appropriate interventions must be identified and delivered to the particular user before the user leaves the particular website or web page.

In certain embodiments, the information used to determine characteristics of the particular user's experience may include feedback, demographic information, web history, and/or contextual information. Feedback from customers, partners, and the general public can be collected through the use of various tools and techniques. For example, feedback may be collected electronically, such as through the use of a computer, PDA, interactive television system, etc. In certain embodiments, feedback may be collected through the use of a feedback mechanism associated with a particular website, web page, or Internet distributed advertisement. Certain embodiments utilize electronically collected feedback, and more particularly feedback collected through a web page mechanism, as an example; however, alternative embodiments may utilize or operate with feedback collected using alternative tools and techniques, alone or in combination with feedback electronically collected through a web page feedback mechanism.

Feedback may be provided and/or collected by various means. For example, feedback may be provided and collected in the form of written or typed comments, verbal comments, physical movements, or by various other means. In certain embodiments, feedback may be provided and collected in the form of comments from a user. For example, in certain embodiments the user may provide feedback by responding to questions or prompts provided electronically. In certain embodiments, a user comment may be provided by selecting a choice from a list, or by checking or marking a visual element. Certain embodiments allow a user to provide feedback by providing written comments, or otherwise communicating a statement. In certain embodiments, feedback may be received and/or collected by receiving user selections, such as selection of elements in a list, diagram, chart, graph, or figure displayed on a web page. Certain embodiments provide for feedback provision and/or collection according to various other methods.

Information associated with a user experience may be collected using various feedback or comment mechanisms such as those discussed above. Additionally, information associated with a user experience may be collected by various other means which do not require user action. In certain embodiments, for example, information associated with a user experience may be acquired from a user's web behavior, such as the amount of time a user spends on a particular web page, the particular features a user selects on a webpage, the identity of a referring URL, stored information associated with the user, the user's browsing history, a user's browser type, a user's screen resolution, a user's operating system, a user's monitor resolution, and from various other known methods for website user information collection.

For example, characteristics of a user's experience may be evaluated based on a referring URL, the time that a user has spent on a page or pages, the features that a particular user has used on a page or pages, information about a user's browser or operating system, and/or a user's screen resolution or other hardware specification. In a particular embodiment, a search of the referring page URL may be performed to determine the existence of a particular word or string pattern. For example, a trigger may be determined based on the existence of the word "video" found anywhere in the referring page URL. In another embodiment, a custom variable may be identified for a particular user and analyzed for trigger criteria. For example, a user ID or classification may be determined based on certain activities performed by the user on the website and the user ID or classification may then be used to determine whether a triggering threshold has been met by that particular user.

Various embodiments may use a variety of triggers or threshold criteria to determine when an intervention should be initiated. For example, an intervention may be initiated automatically upon receipt of negative feedback. As another example, an intervention may be initiated once a user has spent a certain period of time on a particular web page. As another example, an intervention may be initiated if a user returns to the website repeatedly within a specified period of time. In a particular embodiment, an intervention may be triggered in response to an analysis of the words and phrases used in an open-ended comment provided in feedback by the user. In various embodiments, this analysis may be performed through the use of Boolean queries, through the application of Bayesian filters, or through the use of alternative automated inductive learning algorithms or other forms of artificial intelligence.

For example, based on an analysis of a plurality of user generated comments associated with corresponding multi-level ratings, a series of filters may be developed to identify particular words and phrases that, in combination, indicate a positive or negative user experience. These types of filters may be expanded to further consider additional information such as user demographics and contextual data. In certain embodiments, natural language interpretation techniques may be used to analyze particular blocks of text to evaluate the content. In certain embodiments, the threshold or trigger criteria may vary over time or from one user to the next according to specified criteria. For example, the threshold level may increase or decrease to some extent based on randomization logic such that the intervention experience is not identical from one user to the next. Through the use of such variation, additional information may be determined regarding the appropriate trigger levels and/or the appropriate interventions to achieve optimal results.

In certain embodiments, once a triggering threshold has been met and a determination has been made to initiate an intervention, the appropriate intervention may be identified and presented to the particular user. Although in certain embodiments, a single intervention may apply to all users who satisfy the specified triggering threshold, in alternative embodiments, a variety of interventions may be available. For example, different interventions may be associated with different pages within a website, different interventions may be associated with different web traffic histories, different interventions may be associated with different user demographics, etc. In a particular embodiment, comment feedback key-word associations may be used alone or in combination with contextual data to specify a particular intervention. For example, if a negative feedback is identified and the feedback includes a comment that contains the word "video," then an intervention may be identified that provides additional information to that particular user regarding video-related features of the website. Additionally, if the user is using a low resolution monitor to view a website, and the user's monitor-resolution information is included in the information used to determine the appropriate intervention, then an intervention may be selected that is customized for users with low resolution monitors experiencing problems related to video applications. Such intelligent support may enhance the particular user's experience, which may result in continued or increased utilization by the user.

In a particular embodiment, an intervention may be in the form of a trouble ticket form that can be pre-populated with information collected regarding the particular user's experience. For example, in response to determining that a particular user has reported a problem related to a particular product in an open-ended comment box in a feedback form, a trouble ticket form may be generated that identifies the user's operating system type, browser type, the text of the problem reported, the type of product discussed, and/or any other relevant information collected. Such a trouble ticket may be available for the particular user to review and send without having to re-type any of the information previously provided or to type information pre-populated in the trouble ticket form. Such intelligent support may encourage the user to submit the trouble ticket, allowing for a proper response and the possibility of continued use of the product by the user. In certain embodiments, such intelligent support may prevent the provision of the feedback by the user from being the last interaction that the user has with the website, product, or associated entity.

In another particular embodiment, an intervention may be in the form of a link to a different version of a website. For example, in response to determining that a user is dissatisfied with certain types of content on a web page or a website, either because it is offensive or improper, the user may be introduced to an alternative version of the web page or website that has been filtered to remove potentially improper or offensive content.

Figure 4:
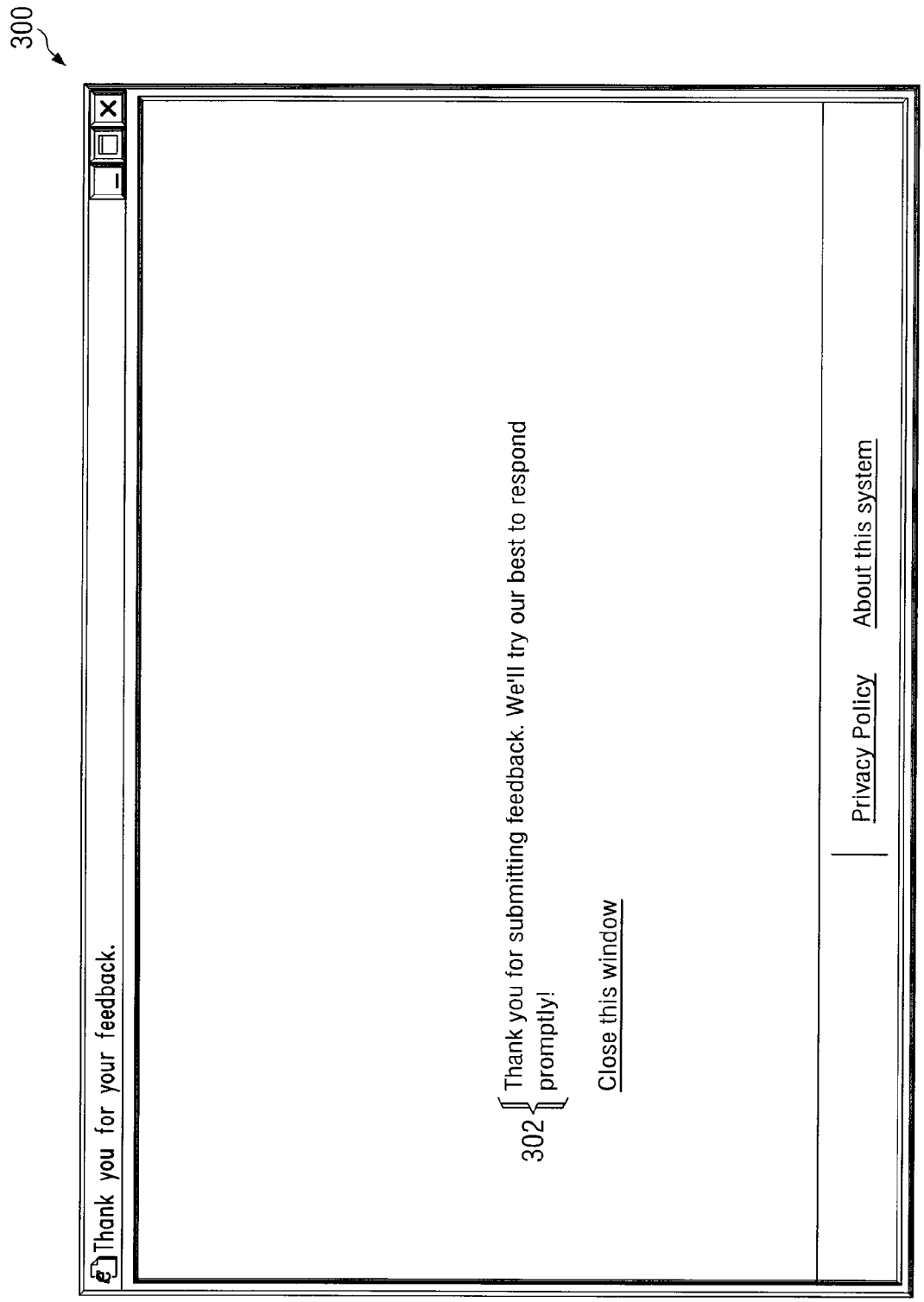
FIG. 4 illustrates an example response to user provided feedback.

In certain embodiments, after a user has provided feedback, a response message may be generated. FIG. 4 illustrates an example response generated after a user provides feedback. The example response shown is in the form of a viewable element illustrated as thank you window 300. In certain embodiments, thank you window 300 may open in a separate window from web page 100, in the same window as web page 100 replacing web page 100, or in a frame within the same window as web page 100. In certain embodiments, thank you window 300 may be integrated with or near other content on web page 100. Thank you window 300 may include response message 302. In certain embodiments, response message 302 may provide a cordial response to the user, an acknowledgment that the user has provided feedback, and/or any other appropriate message for the particular user who provided the feedback.

Figure 5:
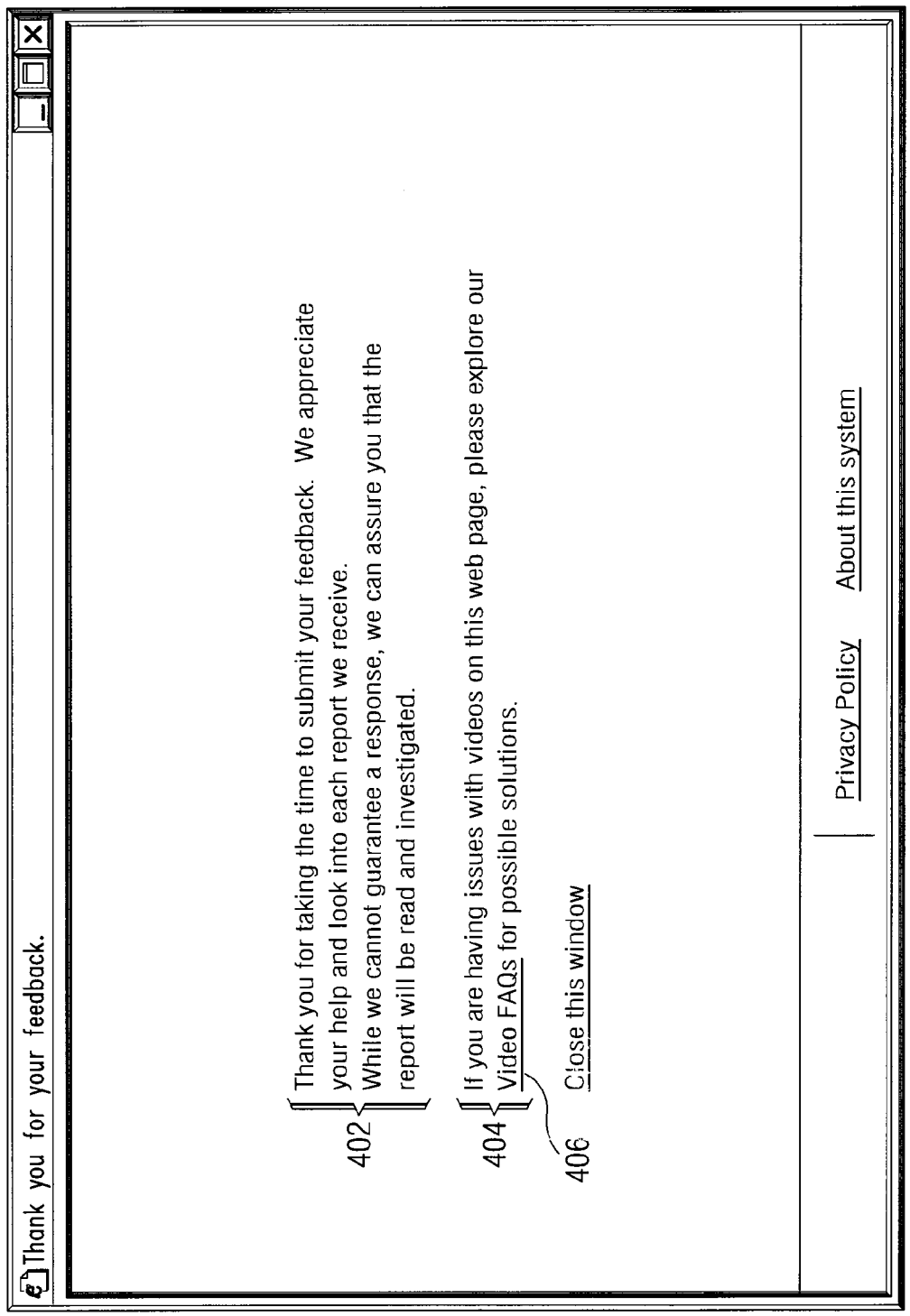
FIGS. 5 and 6 illustrate example interventions.

Based on the particular user's feedback, contextual information about the user's experience, and/or other collected information, a triggering event may be identified and an intervention may be generated. FIG. 5 illustrates an example intervention 400. In the example shown in FIG. 5, intervention 400 includes a message 402 for the particular user in response to receiving the particular user's feedback. The example intervention 400 also includes a customized message intended to address one or more issues related to the user experience for the particular user. For example, if the particular user's feedback indicated that the user was experiencing problems using a video on the web page and/or website, this customized message would provide the particular user with information to address these video-related issues. Specifically, this example customized response would include a link 406 to a frequently asked questions (FAQ) page that addresses issues with displaying videos on the website. This example intervention 400 may be generated as a result of the particular user's website click-through history, the particular user's time on a particular web page, the particular user's operating system information (including version number, update status, plug-in information, etc.), or error messages generated by activities of a particular user. Intervention 400 may be generated in real-time or substantially real-time in response to the user experience of the particular user. In certain embodiments, intervention 400 may be generated before the particular user leaves the web page.

Figure 6:
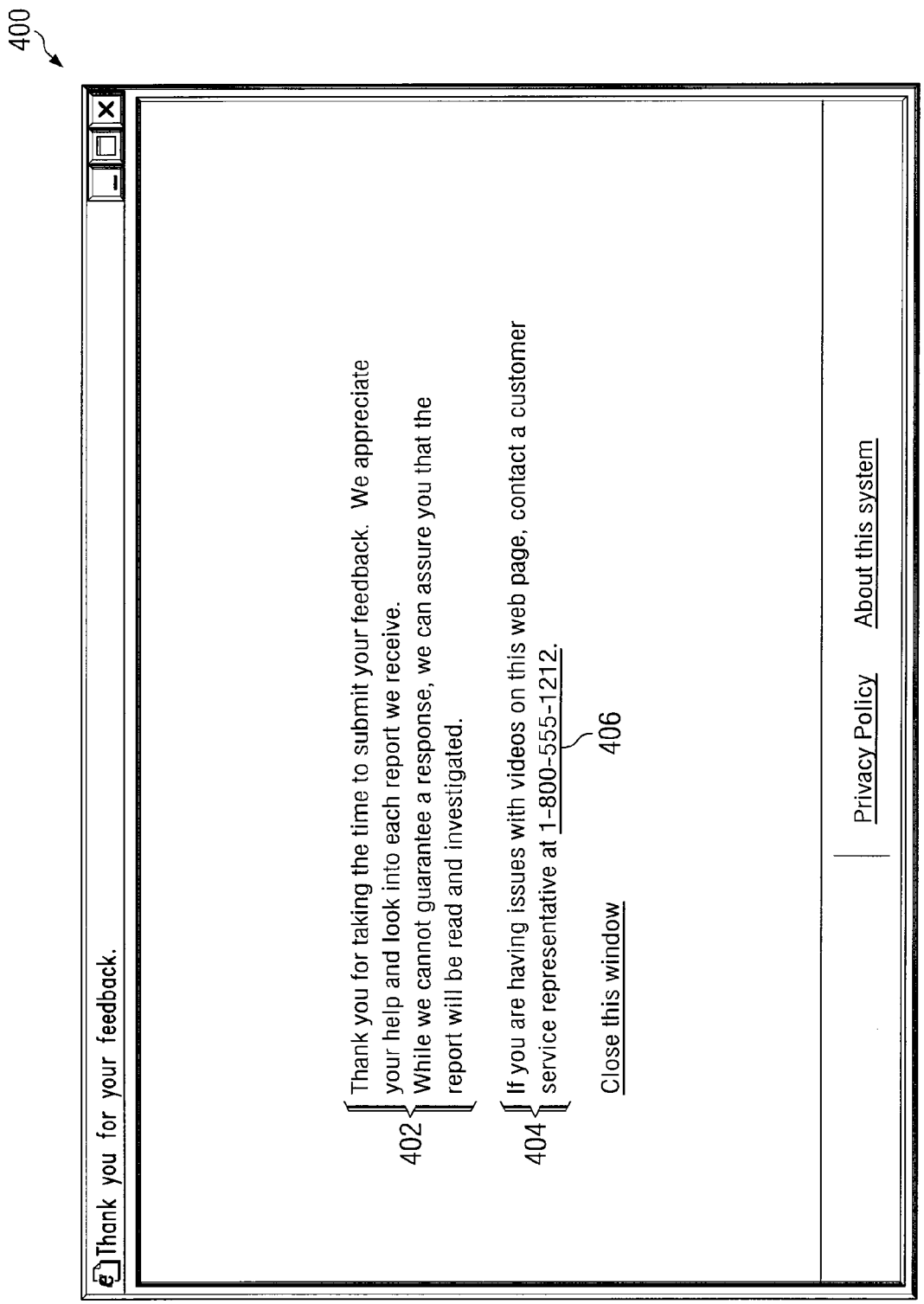

FIG. 6 illustrates another example intervention 400 also shown as a thank you window. In this embodiment, rather than providing a link to an FAQ page, intervention 404 provides a phone number that the user may call to contact a customer service representative. In certain embodiments, the phone number shown may also serve as a link that will enable the user to directly dial the phone number to contact the customer service representative. In alternative embodiments, an appropriate intervention may take the form of an asynchronous messaging window that may allow the user to communicate asynchronously via text messages with a help desk or other form of customer service center. For example, a live chat window may be generated that allows the user to communicate with a particular customer service representative who can assist with a particular issue the user may have. In another embodiment, an intervention may take the form of an audio or video clip that may provide additional information intended to address the user's particular experience. In another embodiment, an intervention may take the form of a direct live audio or video communication, such as a live video conference with one or more individuals who may be able to address the user's particular experience. In certain embodiments, an intervention may offer the user a choice of one or more alternatives that the user may select depending on their particular preferences.

Figure 7:
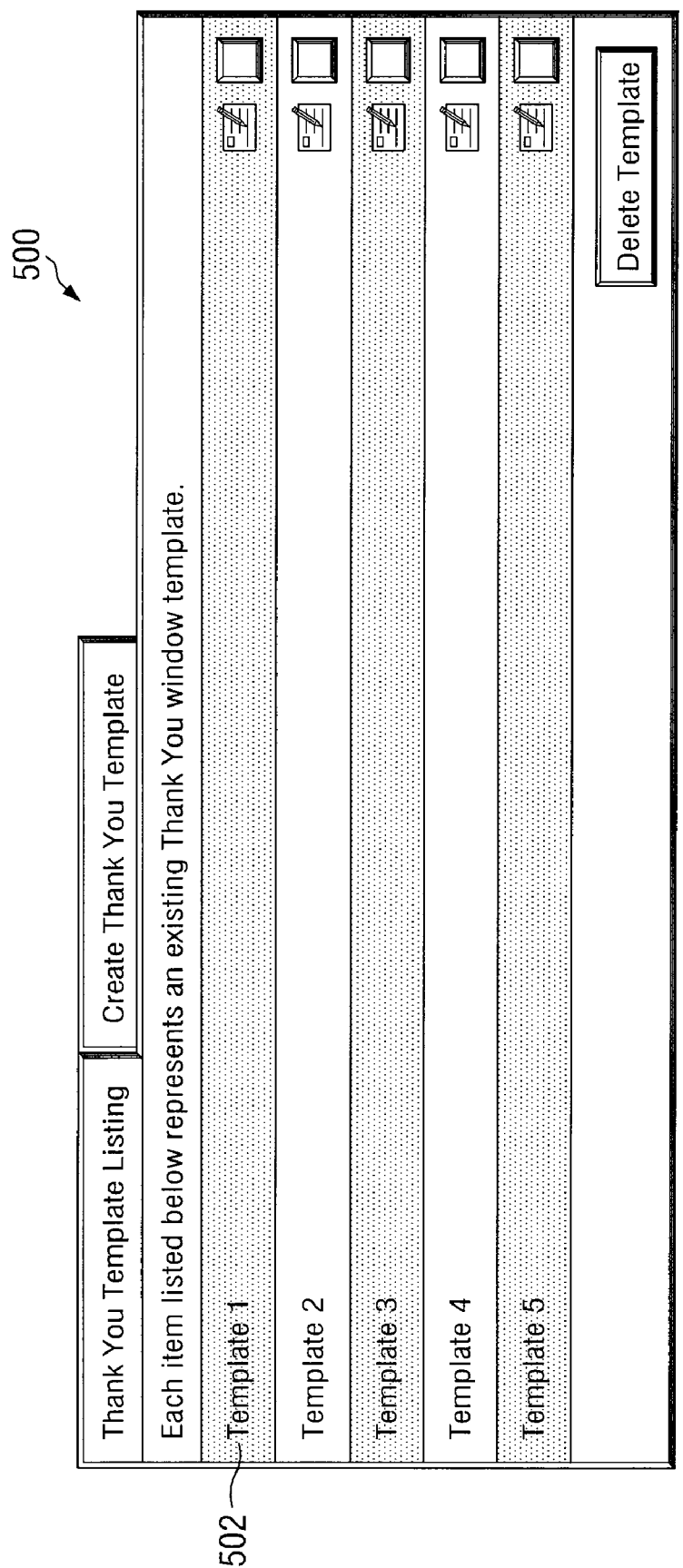
FIG. 7 illustrates an example intervention template tool.

FIG. 7 illustrates an example tool 500 that may be used to create, edit, and/or manage one or more intervention templates 502. Each template 502 may be used as an intervention that may be associated with one or more particular triggers. Alternatively, each template 502 may be used to develop customized interventions for particular users in response to one or more specified triggers. Each template 502 may correspond to a different type or form of intervention. For example, various templates 502 may correspond to a text-based thank you window (with or without a link to another web page, icon, or pop-up screen); to an automated chat window; to a web-based video application; or to another appropriate form of intervention.

Figure 8:
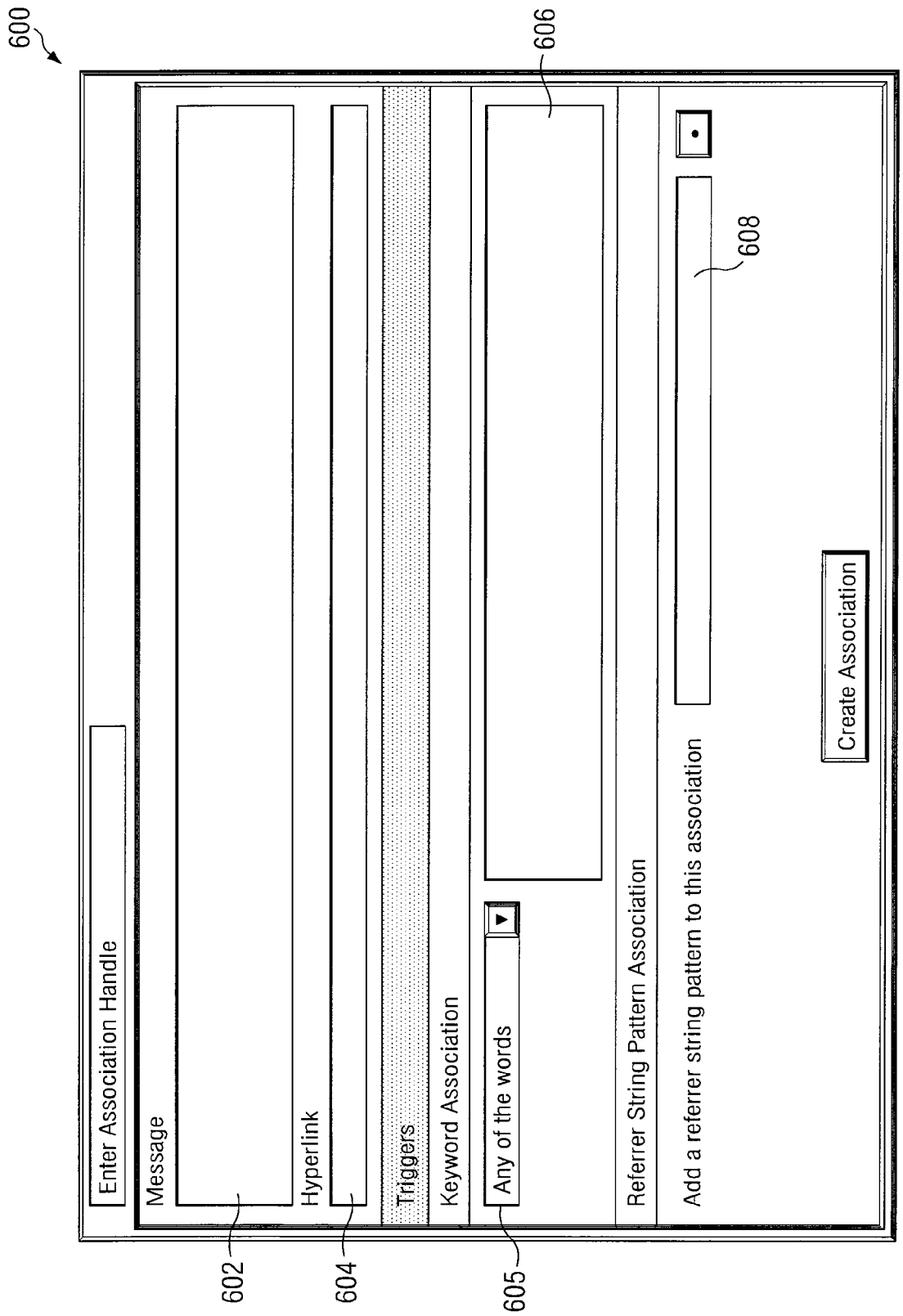
FIG. 8 illustrates an example trigger association tool.

FIG. 8 illustrates an example tool that may be used to associate a trigger with specified content for particular types of interventions. In the embodiment shown, tool 600 includes a message box 602, a hyperlink box 604, a Boolean selector 605, a key-word box 606, and a string-pattern box 608. Using the example tool 600, a website manager may identify a message for the particular user that receives the intervention using message box 602 by typing the appropriate message language into message box 602. In embodiments utilizing interventions with a link to another web page, pop-up window, etc., a website manager may specify the appropriate link using hyperlink box 604. In the example shown, the triggering information may be specified using Boolean selector 605, key-word box 606, and string-pattern box 608. Boolean selector 605 may be used to determine the appropriate Boolean logic to apply for a particular key-word search. For example, Boolean selector 605 may be used to select a search of "any of the words" included in key-word box 606, "all of the words" selected in key-word box 606, an "exact phrase" identified in key-word box 606, or any other appropriate Boolean search logic specification. In certain embodiments, string-pattern box 608 may be used to specify a particular string-pattern to be located within a referring page URL.

Any combination of these or other appropriate triggering information may be used. For example, a topic selection category may be associated with a particular intervention, such that upon selecting a particular topic, such as through the use of a menu, an intervention trigger may be identified. For example, if a user selects a particular product from a drop-down menu, an intervention may be generated that address commonly reported problems with that particular product.

Figure 9:
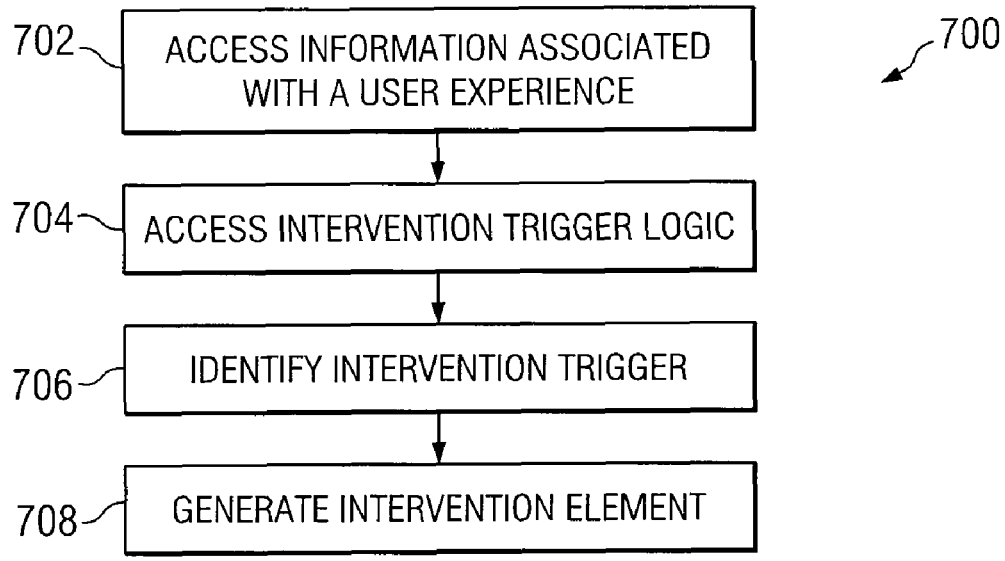
FIG. 9 illustrates an example method for providing intelligent support.

FIG. 9 is a flow chart illustrating an example method 700 for providing intelligent support. At step 702, information associated with a user experience is accessed. The accessed information may include various types of information, such as user feedback, historical data, contextual data, and/or user demographic information. At step 704, intervention trigger logic is accessed. In certain embodiments, such intervention trigger logic may be stored in a database. In certain embodiments, the intervention trigger logic may be developed through the use of a tool that may be used to associate certain triggering criteria with a particular intervention element. At step 706, an intervention trigger is identified. In certain embodiments, an intervention trigger may be identified by applying the intervention trigger logic to at least a portion of the accessed information. At step 708, an intervention element is generated. In certain embodiments, one or more intervention elements may be generated for presentation to the particular user, in response to the identification of at least one intervention trigger, to improve the user experience for the particular user.

Information about a particular user's experience, including user feedback and other types of information, may be leveraged to obtain additional value for or from the particular user. For example, at the time that feedback is provided by a user through the use of a feedback mechanism, such feedback may provide a strong indication of whether the user is having a positive, neutral, or negative experience. By processing this feedback in real-time, alone or in combination with other information, actions can be taken to leverage that particular user's experience at or near that particular point in time. For example, in situations where the particular user is having a positive experience, real-time actions may effectively leverage this positive experience for the benefit of the user, the website manager, an associated entity, etc. For example, if a user provides positive feedback about a product or service and the feedback can be analyzed in real-time (or substantially real-time), then action may be taken to introduce the user to similar or complimentary products or services. As another example, if a user provides feedback indicating that they currently own or use an older product or service, action may be taken to introduce the user to a newer product or service. In a particular embodiment, if it is determined that a particular user is using an older model product, a coupon or advertisement may be generated and/or presented to the particular user to encourage them to upgrade to a newer model product. As yet another example, if collected information indicates that the particular user is a frequent user of particular products or services, then action can be taken to provide additional benefits for that user as a reward for their frequent use. In a particular embodiment, as an example, if a user is viewing an airline website and it is determined that the user is a member of a frequent flyer program, a message may be displayed to the particular user indicating that reduced rates or other advantages may be available to the user if they call in to a preferred customer service phone number or follow a link to a preferred pricing web page.

In some situations, the few seconds after a user's feedback or other information is collected may be the best opportunity to leverage the user's experience, because the information may directly indicate the types of things that the particular user is currently or very recently thinking about and may indicate whether the user has a positive or negative view of those same things. For example, if a user provides feedback indicating that they are very pleased with a particular product, the few seconds after they provide this feedback may be an ideal time to inform them of other products that are complimentary to the product that they are currently pleased with. This opportunity may vanish after the user leaves the web site or after the user has begun considering other topics. Accordingly, the ability to take action in this few seconds may be critical to leverage the experience of a particular user. Appropriate actions may include any of the techniques described herein for interventions and may also include advertisements, coupons, or other marketing and cross-selling techniques. Although not required, in certain embodiments, in order to take action to leverage a particular user's experience, characteristics of the user's experience must be determined, triggering or threshold requirements must be met, and appropriate action must be identified and initiated before the user leaves the particular website or web page.

Figure 10:
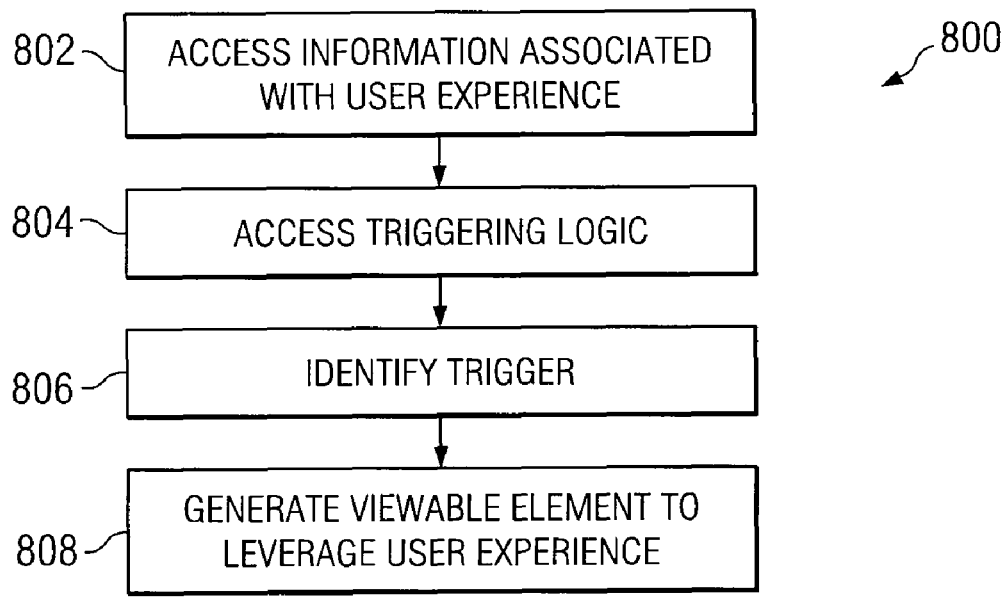
FIG. 10 illustrates an example method for leveraging a user experience.

FIG. 10 illustrates an example method 800 for leveraging a user experience. At step 802, information associated with a user experience is accessed. The accessed information may include various types of information, such as user feedback, historical data, contextual data, and/or user demographic information. At step 804, triggering logic is accessed. In certain embodiments, such triggering logic may be stored in a database. In certain embodiments, the triggering logic may be developed through the use of a tool that may be used to associate certain triggering criteria with actions to leverage a user experience. At step 806, a trigger is identified. In certain embodiments, the trigger may be identified by applying the triggering logic to at least a portion of the accessed information. At step 708, a viewable element is generated to leverage a user experience.

Although example methods are described, the steps may be accomplished in any appropriate order and the present invention contemplates using methods with additional steps, fewer steps, or different steps, so long as the methods remain appropriate for providing intelligent support or leveraging a user experience. For example, certain embodiments may include presenting a generated intervention or viewable element to a particular user. As another example, certain embodiments may include collecting information regarding the particular user's response to at least one of the one or more viewable or intervention elements. For example, certain embodiments may detect whether a user clicked a link provided, viewed a video clip provided, listened to an audio clip provided, called a telephone number provided, purchased an advertised product, applied a coupon, or utilized an asynchronous messaging application, such as a live chat window. Certain types of interventions may include additional feedback collection features that the user may use to provide feedback on the user. For example, if the user was directed to an FAQ page, the user may provide feedback that the page was helpful or not helpful. Certain embodiments utilize such collected information to correlate web-user retention with intervention utilization or to correlate actions taken to leverage the user's experience with benefits obtained by or for that user. For example, certain embodiments may determine what if any impact certain interventions or actions may have on the churn rate of particular users, categories of users, or users in general.

Several embodiments of the invention may include logic embodied in media. For example, certain embodiments include software embodied in a computer readable medium. Such logic may include computer software executable on one or more processors and operable to perform one or more of the functions described herein. Example media may include random access memory (RAM), read only memory (ROM), various types of optical or magnetic disk drives, or removable storage media. For example, logic may be encoded on removable CD, DVD, or tape media. In certain embodiments, the logic may be contained within a hardware configuration or a combination of software and hardware configurations. The logic may also be embedded within any other suitable medium without departing from the scope of the invention.

Although the present invention has been described with several embodiments, a plenitude of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A computer-implemented method for providing intelligent support, comprising:

using a computer system, accessing information associated with a user experience for a particular user of a web page, the accessed information including user feedback collected from the particular user using feedback collection software;

using a computer system, accessing intervention trigger logic;

using a computer system identifying at least one intervention trigger by applying the intervention trigger logic to at least a portion of the accessed information; and using a computer system, generating one or more intervention elements for presentation to the particular user, in response to the identification of at least one intervention trigger, to improve the user experience for the particular user;

wherein the accessed information associated with a user experience for a particular user of a web page includes contextual information regarding one or more aspects of the particular user's access to the web page, the contextual information comprising at least one selected from the group consisting of a referring uniform resource locator, a monitor resolution, a browser type, an operating system type, and an amount of time the particular user has spent on the web page.

2. A computer-implemented method for providing intelligent support, comprising:

using a computer system, accessing information associated with a user experience for a particular user of a web page, the accessed information including user feedback collected from the particular user using feedback collection software;

using a computer system, accessing intervention trigger logic;

using a computer system, identifying at least one intervention trigger by applying the intervention trigger logic to at least a portion of the accessed information; and using a computer system, generating one or more intervention elements for presentation to the particular user, in response to the identification of at least one intervention trigger, to improve the user experience for the particular user;

wherein:

the user feedback comprises at least one comment collected from the particular user using feedback collection software; and the intervention trigger logic is applied to at least a portion of the accessed information by analyzing the contents of the at least one comment collected from the particular user.

3. A computer-implemented method for providing intelligent support, comprising:

using a computer system, accessing information associated with a user experience for a particular user of a web page, the accessed information including user feedback collected from the particular user using feedback collection software;

using a computer system, accessing intervention trigger logic;

using a computer system, identifying at least one intervention trigger by applying the intervention trigger logic to at least a portion of the accessed information; and using a computer system, generating one or more intervention elements for presentation to the particular user, in response to the identification of at least one intervention trigger, to improve the user experience for the user;
wherein:
the user feedback comprises at least one comment collected from the particular user using feedback collection software; and
the intervention trigger logic is applied to at least a portion of the accessed information by analyzing the contents of the at least one comment collected from the particular user; and
wherein analyzing the contents of the at least one comment collected from the particular user comprises applying an inductive learning algorithm to the contents of the at least one comment.

4. A computer-implemented method for providing intelligent support, comprising:
using a computer system, accessing information associated with a user experience for a particular user of a web page, the accessed information including user feedback collected from the particular user using feedback collection software;
using a computer system, accessing intervention trigger logic;
using a computer system, identifying at least one intervention trigger by applying the intervention trigger logic to at least a portion of the accessed information; and
using a computer system, generating one or more intervention elements for presentation to the particular user, in response to the identification of at least one intervention trigger, to improve the user experience for the particular user;
wherein applying the intervention trigger logic to at least a portion of the accessed information comprises at least one selected from the group consisting of searching the user feedback collected from the particular user for one or more key-words, searching the user feedback collected from the particular user for a category selection, and searching a referring uniform resource locator for a string pattern.

5. A computer-implemented method for providing intelligent support, comprising:
using a computer system, accessing information associated with a user experience for a particular user of a web page, the accessed information including user feedback collected from the particular user using feedback collection software;
using a computer system, accessing intervention trigger logic;
using a computer system, identifying at least one intervention trigger by applying the intervention trigger logic to at least a portion of the accessed information;
using a computer system, generating one or more intervention elements for presentation to the particular user, in response to the identification of at least one intervention trigger, to improve the user experience for the particular user; and
using a computer system, presenting at least one of the one or more intervention elements to the particular user in substantially real-time after the user feedback has been collected from the particular user using feedback collection software.

6. A computer-implemented method for providing intelligent support, comprising:
using a computer system, accessing information associated with a user experience for a particular user of a web page, the accessed information including user feedback collected from the particular user using feedback collection software;
using a computer system, accessing intervention trigger logic;
using a computer system, identifying at least one intervention trigger by applying the intervention trigger logic to at least a portion of the accessed information;
using a computer system, generating one or more intervention elements for presentation to the particular user, in response to the identification of at least one intervention trigger, to improve the user experience for the particular user; and
using a computer system, presenting at least one of the one or more intervention elements to the particular user, wherein the at least one of the one or more intervention elements comprises a hypertext link to a web page.

7. A computer-implemented method for providing intelligent support, comprising:
using a computer system, accessing information associated with a user experience for a particular user of a web page, the accessed information including user feedback collected from the particular user using feedback collection software;
using a computer system, accessing intervention trigger logic;
using a computer system, identifying at least one intervention trigger by applying the intervention trigger logic to at least a portion of the accessed information;
using a computer system, generating one or more intervention elements for presentation to the particular user, in response to the identification of at least one intervention trigger, to improve the user experience for the particular user; and
using a computer system, presenting at least one of the one or more intervention elements to the particular user, wherein the at least one of the one or more intervention elements comprises at least one selected from the group consisting of an audio element and a video element.

8. A computer-implemented method for providing intelligent support, comprising:
using a computer system, accessing information associated with a user experience for a particular user of a web page, the accessed information including user feedback collected from the particular user using feedback collection software;
using a computer system, accessing intervention trigger logic;
using a computer system, identifying at least one intervention trigger by applying the intervention trigger logic to at least a portion of the accessed information;
using a computer system, generating one or more intervention elements for presentation to the particular user, in response to the identification of at least one intervention trigger, to improve the user experience for the particular user; and
using a computer system, presenting at least one of the one or more intervention elements to the particular user, wherein the at least one of the one or more intervention elements comprises an asynchronous messaging application.

9. A computer-implemented method for providing intelligent support, comprising:
using a computer system, accessing information associated with a user experience for a particular user of a web page, the accessed information including user feedback collected from the particular user using feedback collection software;
using a computer system, accessing intervention trigger logic;
using a computer system, identifying at least one intervention trigger by applying the intervention trigger logic to at least a portion of the accessed information;
using a computer system, generating one or more intervention elements for presentation to the particular user, in response to the identification of at least one intervention trigger, to improve the user experience for the particular user; and
using a computer system, collecting information regarding the particular user's response to at least one of the one or more intervention elements.

10. A system for providing intelligent support, the system comprising software encoded in a computer readable medium and when executed by one or more processors operable to:
access information associated with a user experience for a particular user of a web page, the accessed information including user feedback collected from the particular user using feedback collection software;
access intervention trigger logic;
identify at least one intervention trigger by applying the intervention trigger logic to at least a portion of the accessed information; and
generate one or more intervention elements for presentation to the particular user, in response to the identification of at least one intervention trigger, to improve the user experience for the particular user;
wherein the accessed information associated with a user experience for a particular user of a web page includes contextual information regarding one or more aspects of the particular user's access to the web page, the contextual information comprising at least one selected from the group consisting of a referring uniform resource locator, a monitor resolution, a browser type, an operating system type, and an amount of time the particular user has spent on the web page.

11. A system for providing intelligent support, the system comprising software encoded in a computer readable medium and when executed by one or more processors operable to:
access information associated with a user experience for a particular user of a web page, the accessed information including user feedback collected from the particular user using feedback collection software;
access intervention trigger logic;
identify at least one intervention trigger by applying the intervention trigger logic to at least a portion of the accessed information; and
generate one or more intervention elements for presentation to the particular user, in response to the identification of at least one intervention trigger, to improve the user experience for the particular user;
wherein:
the user feedback comprises at least one comment collected from the particular user using feedback collection software; and
the intervention trigger logic is applied to at least a portion of the accessed information by analyzing the contents of the at least one comment collected from the particular user.

12. A system for providing intelligent support, the system comprising software encoded in a computer readable medium and when executed by one or more processors operable to:
access information associated with a user experience for a particular user of a web page, the accessed information including user feedback collected from the particular user using feedback collection software;
access intervention trigger logic;
identify at least one intervention trigger by applying the intervention trigger logic to at least a portion of the accessed information; and
generate one or more intervention elements for presentation to the particular user, in response to the identification of at least one intervention trigger, to improve the user experience for the particular user;
wherein:
the user feedback comprises at least one comment collected from the particular user using feedback collection software; and
the intervention trigger logic is applied to at least a portion of the accessed information by analyzing the contents of the at least one comment collected from the particular user; and
wherein analyzing the contents of the at least one comment collected from the particular user comprises applying an inductive learning algorithm to the contents of the at least one comment.

13. A system for providing intelligent support, the system comprising software encoded in a computer readable medium and when executed by one or more processors operable to:
access information associated with a user experience for a particular user of a web page, the accessed information including user feedback collected from the particular user using feedback collection software;
access intervention trigger logic;
identify at least one intervention trigger by applying the intervention trigger logic to at least a portion of the accessed information; and
generate one or more intervention elements for presentation to the particular user, in response to the identification of at least one intervention trigger, to improve the user experience for the particular user;
wherein applying the intervention trigger logic to at least a portion of the accessed information comprises at least one selected from the group consisting of searching the user feedback collected from the particular user for one or more key-words, searching the user feedback collected from the particular user for a category selection, and searching a referring uniform resource locator for a string pattern.

14. A system for providing intelligent support, the system comprising software encoded in a computer readable medium and when executed by one or more processors operable to:
access information associated with a user experience for a particular user of a web page, the accessed information including user feedback collected from the particular user using feedback collection software;
access intervention trigger logic;
identify at least one intervention trigger by applying the intervention trigger logic to at least a portion of the accessed information;
generate one or more intervention elements for presentation to the particular user, in response to the identification of at least one intervention trigger, to improve the user experience for the particular user; and
present at least one of the one or more intervention elements to the particular user in substantially real-time after the user feedback has been collected from the particular user using feedback collection software.

15. A system for providing intelligent support, the system comprising software encoded in a computer readable medium and when executed by one or more processors operable to:
  access information associated with a user experience for a particular user of a web page, the accessed information including user feedback collected from the particular user using feedback collection software;
  access intervention trigger logic;
  identify at least one intervention trigger by applying the intervention trigger logic to at least a portion of the accessed information;
  generate one or more intervention elements for presentation to the particular user, in response to the identification of at least one intervention trigger, to improve the user experience for the particular user; and
  present at least one of the one or more intervention elements to the particular user, wherein the at least one of the one or more intervention elements comprises a hypertext link to a web page.

16. A system for providing intelligent support, the system comprising software encoded in a computer readable medium and when executed by one or more processors operable to:
  access information associated with a user experience for a particular user of a web page, the accessed information including user feedback collected from the particular user using feedback collection software;
  access intervention trigger logic;
  identify at least one intervention trigger by applying the intervention trigger logic to at least a portion of the accessed information;
  generate one or more intervention elements for presentation to the particular user, in response to the identification of at least one intervention trigger, to improve the user experience for the particular user; and
  present at least one of the one or more intervention elements to the particular user, wherein the at least one of the one or more intervention elements comprises at least one selected from the group consisting of an audio element and a video element.

17. A system for providing intelligent support, the system comprising software encoded in a computer readable medium and when executed by one or more processors operable to:
  access information associated with a user experience for a particular user of a web page, the accessed information including user feedback collected from the particular user using feedback collection software;
  access intervention trigger logic;
  identify at least one intervention trigger by applying the intervention trigger logic to at least a portion of the accessed information;
  generate one or more intervention elements for presentation to the particular user, in response to the identification of at least one intervention trigger, to improve the user experience for the particular user; and
  present at least one of the one or more intervention elements to the particular user, wherein the at least one of the one or more intervention elements comprises an asynchronous messaging application.

18. A system for providing intelligent support, the system comprising software encoded in a computer readable medium and when executed by one or more processors operable to:
  access information associated with a user experience for a particular user of a web page, the accessed information including user feedback collected from the particular user using feedback collection software;
  access intervention trigger logic;
  identify at least one intervention trigger by applying the intervention trigger logic to at least a portion of the accessed information;
  generate one or more intervention elements for presentation to the particular user, in response to the identification of at least one intervention trigger, to improve the user experience for the particular user; and
  collect information regarding the particular user's response to at least one of the one or more intervention elements.

19. A computer-implemented method for providing intelligent support, comprising:
  using a computer system, accessing information associated with a user experience for a particular user of a web page, the accessed information including user feedback collected from the particular user using feedback collection software;
  using a computer system, accessing intervention trigger logic;
  using a computer system, identifying at least one intervention trigger by applying the intervention trigger logic to at least a portion of the accessed information, wherein applying the intervention trigger logic to at least a portion of the accessed information comprises at least one selected from the group consisting of searching the user feedback collected from the particular user for one or more key-words, searching the user feedback collected from the particular user for a category selection, and searching a referring uniform resource locator for a string pattern;
  using a computer system, generating one or more intervention elements for presentation to the particular user, in response to the identification of at least one intervention trigger, to improve the user experience for the particular user; and
  using a computer system, presenting at least one of the one or more intervention elements to the particular user in substantially real-time after the user feedback has been collected from the particular user using feedback collection software.

* * * * *